United States Patent Office 3,361,162
Patented Jan. 2, 1968

3,361,162
FLUID FLOW CONTROLLER
James C. Prestridge, Menomonee Falls, and Ramon J. Chesner, Brookfield, Wis., assignors to Allis-Chalmers Manufacturing Company, Milwaukee, Wis.
Filed Feb. 17, 1966, Ser. No. 528,199
4 Claims. (Cl. 137—625.3)

This invention relates to a combined fluid filter and flow regulating mechanism and particularly to means for controlling and filtering very low flow rates of low density gases.

The development of a fuel cell power generating unit for space craft use has given rise to the need for a compact, light weight and reliable flow control mechanism which is suitable for control of low density gases containing water vapor contaminated with strong alkalies or acids and is capable of operation during and after shock, vibration and acceleration stresses of a space vehicle launch. The valve and filter mechanism must be capable of fine adjustment including shutoff of the flow rate of the low density gases being controlled. Other desired characteristics which are found in the present combined filter and flow regulator are simplicity of design, light weight, small size and resiliency of the restrictor or filter element permitting increases in flow after adjustment for low flow conditions. Additionally, the control mechanism of the present invention has capability of reverse flow operation.

Heretofore, filters with means to vary flow have been suggested, however, these are not suitable for filtering low density gases under the conditions hereinbefore outlined. One of the prior art devices suggests the use of asbestos for filtering and regulating flow. However, asbestos tends to compact when squeezed, thereby making it difficult to obtain a controlled increase in flow rate by releasing the pressure on the asbestos. A high gas pressure differential across the valve or filter causes the asbestos compact resulting in additional decrease in flow rate. Further, asbestos absorbs moisture from the gases and becomes wetted, thereby causing the asbestos pieces to adhere to each other. Also, heretofore it has been suggested that a filter element be made with or conditioned to have large size pores on its inlet side and small size pores on its outlet side in order to prolong the life of the filter element.

In the present invention it is desired to provide a filter element of material having uniform pore size wherein compression of the filter element will uniformly reduce the pore so as to obtain a uniform filtering of the gas. Also it is desired to provide a filter mechanism which will be an effective filter on reversal of flow therethrough.

Another characteristic of the present invention which is desired in its use in a fuel cell system is its ability to be adjusted from the exterior of the filter mechanism. That is, the porous element serving as the filter and flow regulating means can be adjusted from the exterior of the mechanism without requiring its removal or disassembly.

Heretofore needle valves and orifice plates have been employed to regulate low rates of flow. However, in regulating the very small flow of gases from a fuel cell with a needle valve, foreign matter, such as small crystals, clog the very small openings of these devices. Low density gases required these devices to have very small openings in order to regulate the flow to the very small rate required for proper operation of the fuel cell power unit.

It is an object of this invention to provide a combined filter and flow regulating valve for low density gases which will operate during and after shock, vibration and acceleration stresses of a space vehicle launch.

It is a further object of this invention to provide a flow regulating device which is capable of extremely fine adjustment, including shutoff, without clogging by small foreign particles.

It is a further object of this invention to provide a combined flow regulating device and filter which is small, light weight and reliable.

It is a further object of this invention to provide a combined filter and flow regulating mechanism which is suitable for the control of flow of low density gases containing contaminants, for instance, water vapor contaminated with strong alkalies or acids.

It is a further object of this invention to provide a filter and flow regulating mechanism having a resilient non-metallic filter element which will not take a permanent set when compressed to a shutoff condition.

It is a further object of this invention to provide a combined flow regulator and filter which is equally operable for reverse flow conditions.

These and other objects of this invention will be apparent when the following description is read in conjunction with the drawings in which.

Figure 1:
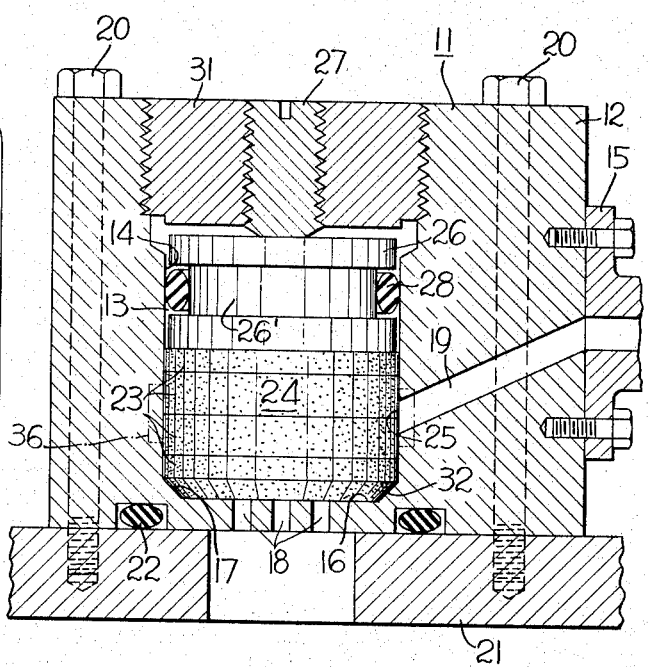
FIG. 1 is a section view of the combined filter and flow regulator.
Figure 2:
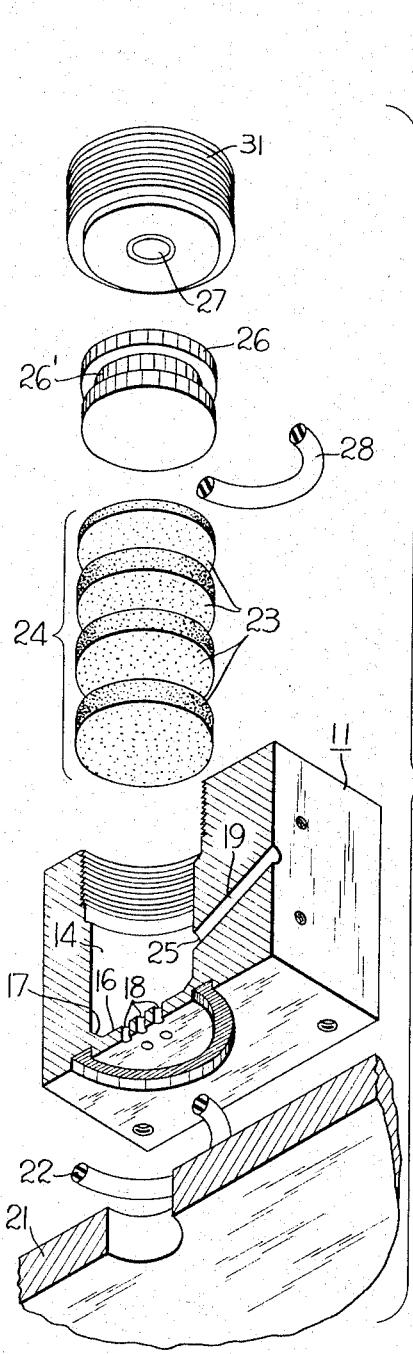
FIG. 2 is an exploded view of the combined filter and flow regulator mechanism shown in FIG. 1.

The combined fluid filter and flow regulating mechanism 11 as shown in FIG. 1 is installed between a fuel cell manifold 21 and a cyclically operated shutoff valve 15, only a portion of which is shown. The filter and flow regulating mechanism 11 shown in FIGS. 1 and 2 includes a housing 12 having walls defining a cylindrical cavity 13. The walls defining cavity 13 include an inward facing cylindrical wall or surface 14 and a bottom wall 16 which tapers upwardly at the radially outer edge of its flat interior surface so that it is of increased thickness adjacent its junction with the cylindrical side wall 14. The upwardly tapering portion takes the form of a conical surface 17.

A plurality of inlet passages 18 are formed in the housing 12, terminating in ports at the bottom wall 16 and an outlet passage 19 is formed in the housing to terminate in a port 25 at the cylindrical wall 14 in spaced relation to the inlet passages 18. The housing 12 is attached to manifold 21 of the fuel cell unit by cap screws 20 and is sealed in relation thereto by an O-ring 22.

In order to provide suitable filtering and proper control of gas flow, a plurality of circular disks 23 are installed in the cylindrical cavity 13. The disks 23 which make up a filter element 24 are made of nonmetallic, nonabsorbent, substantially chemically inert and porous material. Preferably the resilient filter material has uniform pore size to give optimum filtering of the gas or vapor being exhausted. Adjusting means in the form of a plunger 26 and set screw 27 are provided for adjusting the size of the filter element 24. The plunger 26 has a recess 26' in which an O-ring 28 is installed to obtain sealing between the housing and the plunger 26.

When set screw 27 is turned, the size of the filter element is adjusted, thereby adjusting the size of the pores of the filter material to vary the flow from inlet passages 18 to outlet passages 19. When the set screw 27 is turned into the threaded plug 31 of the housing 12 a predetermined extent, the pores of the filter material will be reduced sufficiently to stop the flow of gas. Thus, the filter and flow regulating mechanism is an effective shutoff valve as well as a filter and flow regulating mechanism. When the filter element 24 is installed the cylindrical bottom edge 32 thereof as compressed a greater extent than the other portion of the filter element due to the raised portion 17 and this creates an effective seal at the lower-outer periphery of the filter element. This tends to prevent the flow of gas along the cylindrical side wall 14, thus obviating improper filtering of the gas being exhausted.

By using a plurality of inlets 18 to provide a relatively large surface area at the inlet portion of the filter, the mechanism is much less likely to become clogged than other mechanisms such as needle valves. In units such as fuel cells, small crystals may sometimes form and be carried out of the unit in the exhaust of gases or vapors and these can create malfunction in devices such as needle valves. However, in the subject device the large surface area of the filter material avoids clogging. The filter material may be trifluorochloroethylene having a mean pore opening of 15 microns when not compresesd. Such material has been found to be nonabsorbent and chemically inert thus being unaffected by strong acids, alkalies, oxidants and organic solvents. Such material is also resilient whereby upon retraction of the plunger 26 from a shutoff position, for instance, an increased flow can again be obtained. It should be understood that in the shutoff condition the plunger is above the inner end of outlet passage 19.

The design of the filter and flow regulating mechanism is such as to permit easy replacement of the filter element 24 and, if a particular application so requires, a reverse flow is practical. Also the flow rate can be adjusted through a component, in the form of set screw 27, which is accessible from the outside of the housing 12. In some installations it may be preferable to provide an annular groove 36, shown in dot-dash lines in FIG. 1, which will provide more uniform distribution of flow of fluid through the filtering material.

The embodiments of the invention for which an exclusive property or privilege is claimed are defined as follows:

1. A combined fluid filter and flow regulating mechanism comprising:
   a housing with
      a cylindrical side wall and a bottom wall defining an interior cavity, said bottom wall presenting a flat interior surface and a raised portion adjacent its junction with said side wall,
      a plurality of inlet passages in said bottom wall, and
      an outlet passage in said cylindrical wall having a port opening into said cavity at a point spaced from said bottom wall,
   a cylindrical nonmetallic filter element of nonabsorbent, chemicallly inert, porous and resilient material in said cavity in confronting relation to said openings and port and in sealing engagement at its cylindrical bottom edge with said raised portion, and
   means for adjusting the size of said element to adjust the size of its pores thereby adjusting the rate of fluid flow therethrough including an adjusting component accessible from the outside of said housing.

2. The structure set forth in claim 1 wherein said means for adjusting the size of said element includes a plunger shiftable axially in said cavity by adjustment of said component and further comprising a sealing ring on said plunger in sealing engagement with said cylindrical wall.

3. The mechanism set forth in claim 2 wherein fluid flow therethrough may be stopped by shifting said plunger to cause a predetermined reduction in the size of said element.

4. The mechanism set forth in claim 1 wherein said material has substantially uniform size pores.

References Cited

UNITED STATES PATENTS

| | | | |
|---|---|---|---|
| 2,090,727 | 8/1937 | Gosman | 138—43 |
| 2,304,689 | 12/1942 | Hanson | 138—46 X |
| 2,327,195 | 8/1943 | Kosky et al. | 138—43 |
| 2,451,387 | 10/1948 | Harvuot | 138—46 |
| 2,576,192 | 11/1951 | Poznik | 251—368 X |
| 3,316,936 | 5/1967 | Gongwer | 251—5 X |

M. CARY NELSON, *Primary Examiner.*